Oct. 28, 1952     A. A. KOTTMANN     2,615,553
ARTICLE CONVEYER AND TRANSFER MECHANISM
Filed March 11, 1949     7 Sheets—Sheet 1

INVENTOR
*Arthur A. Kottmann*
BY
*Evans + McCoy*
ATTORNEYS

Oct. 28, 1952 A. A. KOTTMANN 2,615,553
ARTICLE CONVEYER AND TRANSFER MECHANISM
Filed March 11, 1949 7 Sheets-Sheet 2

INVENTOR
Arthur A. Kottmann
BY Evans & McCoy
ATTORNEYS Patented Oct. 28, 1952

2,615,553

UNITED STATES PATENT OFFICE 2,615,553

ARTICLE CONVEYER AND TRANSFER MECHANISM

Arthur A. Kottmann, Davenport, Iowa, assignor to The Bettendorf Company, Bettendorf, Iowa, a corporation of Maryland Application March 11, 1949, Serial No. 80,878

13 Claims. (Cl. 198—27)

This invention relates to the moving or handling of a continuous series or succession of articles, more particularly to apparatus for handling articles serially in such a manner that they are advanced or forwarded one by one for individual processing.

Objectives

In the processing and packaging of articles in large numbers, it is frequently the practice to perform a series of sequential operations on the articles, the articles being advanced in single file fashion to and through one instrumentality after another. In such processing it is desirable to provide for the transfer of articles from each instrumentality to the next with such regularity and exactness that the need for manual handling or even constant attention of an operator is eliminated or at least minimized. It is therefore one of the principal objects of the present invention to provide a generally improved article handling apparatus for moving articles serially and one at a time between successive operating instrumentalities.

As a more specialized object it is sought to provide an improved conveyor system for articles such as bread loaves and other bakery products for supporting and advancing such articles for partial processing in one instrumentality such as a slicing machine and for then further advancing and transferring the partially processed articles one at a time to another instrumentality such as a wrapping machine for additional processing. As one element of the inventive concept, there is provided a shuttle or transfer platform interposed between slicing machine discharge and wrapping machine infeed conveyors, both conveyors being flight type. Preferably the shuttle is in the form of a vertically movable platform arranged to shift or reciprocate between raised and lowered positions as by a swinging or tilting movement for gravity assistance in article transfer.

Another object pertains to the problem of providing conveyor adjustment to accommodate articles of different sizes, satisfied in the present invention by a unique combination of a compensating device for advancing or retracting, relatively, the flights of one conveyor with respect to the flights of both preceding and succeeding conveyors and a clutch having improved one point stop and one point start characteristics. More particularly defined, the compensator-clutch combination incorporates means whereby all of the flights of one conveyor, such as the discharge or transfer conveyor of a bread slicing machine, may be uniformly and simultaneously advanced or retracted relative to not only the flights of a preceding conveyor such as the slicing machine feed conveyor, but also to the flights of a succeeding conveyor such as the infeed conveyor of a bread wrapping machine.

So that the cyclic or phase relationship between the flights of the several conveyors is maintained regardless of the stopping and starting of one of the conveyors, so that the flights of the one conveyor always stop in the same predetermined positions, and so that stoppage of one of the conveyors with an article only partially transferred to the next succeeding conveyor is avoided, driving of the conveyor to be stopped and started is effected by means of an improved type of so called "one point" clutch adapted to restrict the stopping of the conveyor controlled thereby to a single point in the clutch cycle.

The invention thus aims to provide a conveyor system particularly adapted for use in a bread slicing machine having downwardly inclined aprons for supporting bread loaves moving into and through the cutters. The conveyor for receiving sliced bread loaves from the cutters has flights shiftable bodily relative to the flights of the conveyor which feeds loaves into the cutters to permit adjustment that minimizes the free movement of each article in sliding down one of the inclined aprons subsequent to the slicing operation, and an escapement or movable transfer platform moves sliced loaves from the slicing machine conveyor to a succeeding wrapping machine conveyor, the platform being timed and coupled to the conveyors for all adjusted positions of the slicer conveyor flights.

Other objects and advantages relating to certain details of construction and novel combinations and arrangements of parts contributing to simplicity and economy of the apparatus will become apparent in the following detailed description of a suitable embodiment of the invention. This description is made in connection with the accompanying drawings forming a part of the specification. Like parts throughout the several views are indicated by the same letters and numerals of reference.

In the drawings:

Fig. 12 is a diagrammatic elevational view showing a slicing machine-wrapping machine tandem combination and illustrating the driving connections between the coupled conveyors of the two machines;

General arrangement

The invention is presently incorporated in a slicing machine wrapping machine combination coupled in tandem, although other coupling arrangements are contemplated. The illustrative slicing machine may be of the type employing a plurality of endless cutter bands, such a machine of suitable construction in general being more fully described in co-pending application for patent, Serial No. 740,542. See also United States Patent 2,379,911. The machine comprises a supporting structure of cast metal side frames 1 and 2 and suitable connecting cross members. Upper and lower drums, one of which is indicated at 3, are rotatable about spaced parallel axes and carry a plurality of crossed bands 4 which have sharpened edges facing in the direction of on-coming articles or bread loaves A to be processed in the machine.

Articles to be sliced are placed on a loading conveyor 5 and are moved from such conveyor through an escapement mechanism, not shown, to an infeed conveyor 6. The infeed conveyor slopes downwardly into the slicing zone and is of the flight type to individually advance the loaves or articles into and through the moving driven cutters 4. During the slicing operation the articles are guided above and below by banks of adjustable fingers 7 and 8, which also straddle the individual runs of the cutter bands 4 to space and guide the latter. Guides 9 and 10 on the loading and infeed conveyors are engageable with the ends of articles being advanced through the machine and are adjustable to accommodate articles of different sizes.

Sliced articles from the cutter bands 4 are received on a discharge or transfer conveyor D and are moved thereby one at a time onto a receiving conveyor C, which may be the infeed conveyor of a conventional wrapping machine. The wrapping machine parts illustrated are those shown in United States Patent 2,088,157 although other constructions and types can also be incorporated in the combination. It is an important feature of the present invention that the slicer discharge conveyor D and the tiltable transfer platform are arranged to control the movement of articles so as accurately and uniformly to deposit one article or loaf in each pocket or ahead of each flight of the receiving wrapper conveyor C.

The present description of the invention is arranged and titled for convenience into a number of topics, it being understood of course that the several parts combine to produce the desired unitary result and that advantages of the several parts and constructions may be set forth or appear in any of the descriptive material and drawings.

Transfer conveyor

Figures 13, 14, 15, 16, 17:
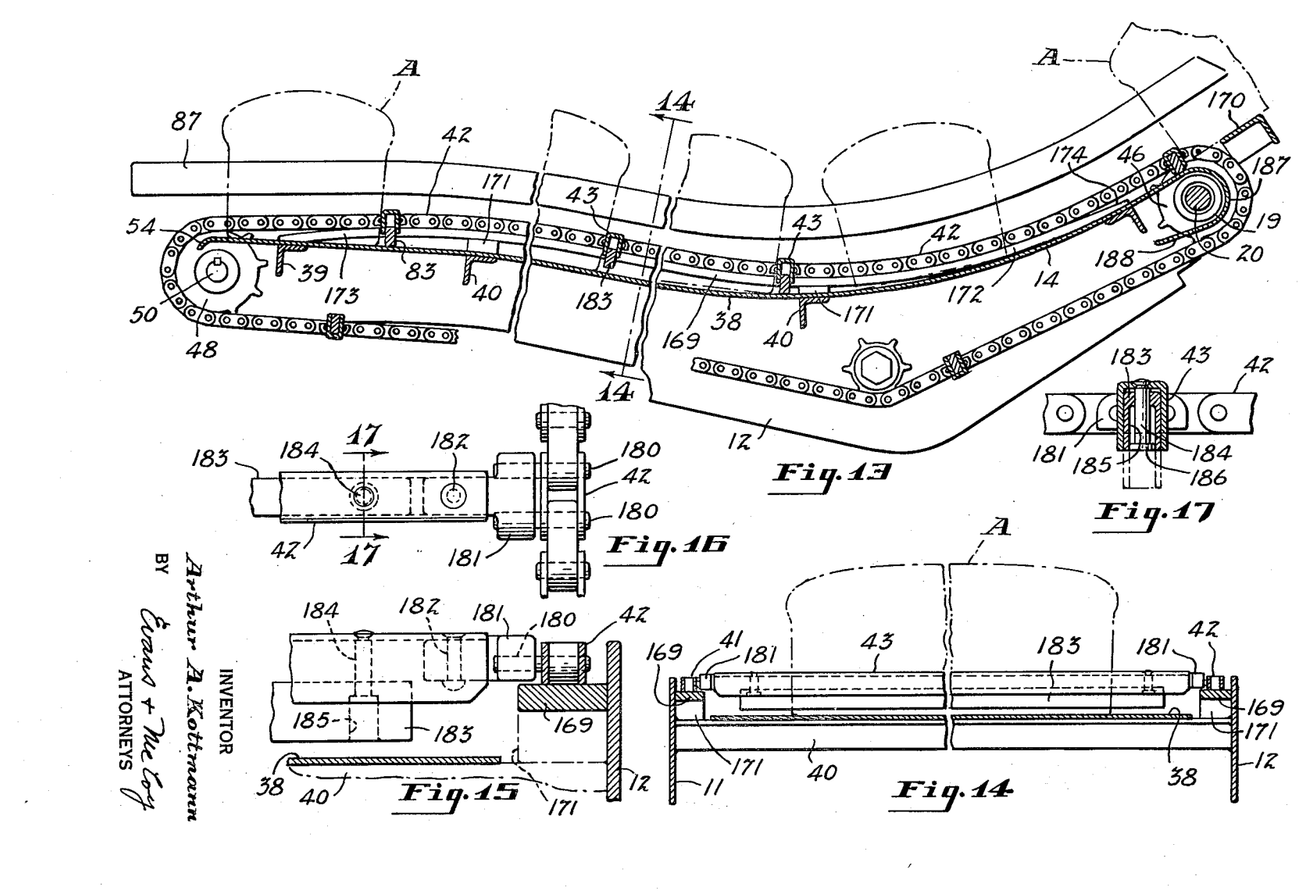
Fig. 13 is a foreshortened vertical sectional view, parts being removed and parts being broken away, taken longitudinally through the transfer or slicer discharge conveyor to show one of the curved rails which support the conveyor side chains and which elevate such chains above the level of the conveyor apron.
Fig. 14 is a foreshortened sectional view taken transversely through the transfer or discharge conveyor, this view being taken substantially along the line indicated at 14—14 of Fig. 13.
Fig. 15 is a sectional detail through one side of the conveyor, this view corresponding to Fig. 14 and being enlarged with respect thereto.
Fig. 16 is a fragmentary detail plan view showing one end of a flight and the manner of connecting the flight to the side chain.
Fig. 17 is a sectional detail taken substantially along the line indicated at 17—17 of Fig. 16.

The conveyor D comprises spaced, generally parallel metal frame members 11 and 12 having ends, adjacent the slicer, upturned to provide a conveyor receiving end 14 that is inclined in general alignment with the apron of the downwardly sloping infeed conveyor 6. The other ends of the frame members, remote from the slicer, are supported as by adjustable height posts 16 attached to a cross rod 17 that extends through depending portions 18 of the conveyor frame members. Articles received from the cutters 4 by the transfer conveyor D move onto a sheet metal apron 38, supported at spaced intervals by cross members extending between the frames 11 and 12, some of the cross members being indicated at 39 and 40 (Figure 13).

A quill 19 and shaft 20 combination (Figure 4) supports the receiving end 14 of the transfer conveyor, the conveyor frames 11 and 12 being apertured to receive flanged bushings 21 and 22, respectively, that are embraced by journal portions 23 and 24 of brackets 25 and 26 attached against the inside faces of the slicer side frames 1 and 2. In raising and lowering the outfeed end 15 of the discharge conveyor, the bushings 21 and 22 turn in the journals 23 and 24, the bushings being secured to the conveyor frames 11 and 12 as by screws not shown which extend through the bushing flanges and into the metal of the frames.

Spaced endless side belts or chains 41 and 42 are disposed in generally parallel relation adjacent and just inside the frame members 11 and 12. A number of flights 43 are connected between the side chains at uniformly spaced intervals for movement over the conveyor apron 38. The flights individually engage the front or leading sides of articles received on the sloping end 14 of the conveyor to restrain and control the downward sliding movement of such articles over the supporting apron 38. At the bottom of the downwardly inclined portion of the conveyor apron the flights engage the rear or trailing sides of the articles to positively move them one at a time toward the conveyor discharge end 15.

At the receiving end of the conveyor the side chains 41 and 42 are trained about and supported on drive sprockets 45 and 46, respectively, secured on the quill 19. At the discharge end 15 the chains are trained about and supported upon sprockets 47 and 48 secured on stub shafts 49 and 50, respectively. These shafts are rotatably supported in journals 51 of extension brackets 52 and 53 secured on and projecting beyond the ends of the conveyor frame members 11 and 12. The conveyor apron 38 extends to a position adjacent and slightly beyond the common rotational axis of the chain supporting sprockets 47 and 48, preferably being formed at its discharge end with a downwardly curved lip 54. The apron 38 is notched out as indicated at 55 at the corners adjacent the chain sprockets 47 and 48 to accommodate the latter and the ends of the stub shafts 49 and 50.

Side guides 87 are adjustably supported as by brackets 88 over the conveyor apron 38. These guides are normally supported in parallel relation to one another and in alignment with the guides 35 corresponding thereto on the wrapper infeed or receiving conveyor C.

The flights 43 are in the form of channel members substantially U shaped in cross section. In moving around the sprockets 45 and 46 at the receiving end of the transfer conveyor, these flights pass through a relatively narrow space between the conveyor apron 38 and a cross member 170 which is aligned with the ends of the lower blade guiding fingers 8. It is desirable that the flights be of relatively low height as they move onto the upper run of the conveyor path so that they can pass readily through the space mentioned and so that an article or loaf A resting on and overhanging the edge of the cross member 170 is not excessively displaced or shifted by the flight as the latter moves into position above the conveyor apron to engage behind the preceding article deposited on the receiving end 14 of the conveyor.

It is also desirable that the flights be of relatively low height at the discharge end of the transfer conveyor D where the flights move around rotatable members or sprockets 47 and 48 and drop below the article path through slot 71 between the conveyor apron lip 54 and the tiltable transfer platform. A flight which extends up the rear side of an article as the latter is moved onto the tiltable platform, later described, tends to bite into such rear side and to pinch the lower edge corner of the article, especially when the article is a relatively soft, freshly baked bread loaf. The relatively low channel sectioned bar flights 43 provide the desired swinging action to advance the articles completely onto the tiltable platform without objectionable crushing or pinching tendencies.

Between the infeed and discharge ends of the transfer conveyor, however, and over the major portion of the conveyor length, it is preferable to have flights of relatively greater height than at the ends of the conveyor so as to engage a substantial portion such as about at least one-third of the height of the rear side of each article being advanced over the conveyor.

In the construction of the present conveyor, the side belts or chains 41 and 42 are supported throughout the major portions of their upper runs by tracks 169 of varying height. These tracks may take the form of flat metal bars disposed against the inside faces of the conveyor side members 11 and 12. The tracks are secured against the conveyor side members as by welding and are elevated above the supporting cross members 40 by spacing blocks 171. At or adjacent the ends of the conveyor the initial and terminal track ends 172 and 173, respectively, are curved or formed so that the upper or chain supporting faces of the tracks approach relatively close to the plane or surface of the apron 38. The spacing blocks 171 are of reduced height or are omitted at the end cross members, see cross member 39, Fig. 13. Throughout the major portion of the conveyor length, however, the side chains 41 and 42 are elevated by the tracks above the plane or level of the conveyor apron 38, as shown in Figs. 13 and 14. The flights 43 are thus supported in elevated positions with respect to the conveyor apron so that the flights engage portions of the articles which are relatively high up the rear sides of such articles.

In moving over their article advancing runs, the flights 43, which are closely adjacent the conveyor apron 38 as they start at the receiving end 14 of the conveyor, are gradually and progressively raised to their position of maximum elevation spaced above the conveyor apron, the flights then move over the major portion of their article advancing paths in their elevated positions and then, approaching the discharging end of the conveyor, the flights are gradually lowered as the side chains move over downwardly inclined or curved portions of the tracks 173 to positions closely adjacent the conveyor apron 38. The described low-high-low cycle of each flight as it moves over the article advancing path of the transfer conveyor D provides a positive vertical or up and down sliding movement of the flight relative to the article being advanced thereby. Such relative movement has a benefit action in arranging or justifying misplaced slices and in applying pressure to relatively elevated portions of the article being advanced. It is apparent, of course, that the tracks 169 can be raised or lowered to any desired elevation relative to the conveyor apron 38 for providing the desired flight height.

At the receiving end 14 of the transfer conveyor the initial ends 172 of the tracks 169 are preferably formed so that their chain supporting surfaces approach the plane or surface of the conveyor apron 38 in substantially tangential curves. The starting ends of the tracks 169 may also be beveled as indicated at 174 to facilitate the movement of the chains onto the tracks.

The flight bars 43 are mounted to float between the chain belts 41 and 42 so that in moving around the different pairs of end rotatable members or sprockets of the conveyor, the chains are free to shift toward or away from one another without imposing objectionable strains on the mechanism. At the spaced positions along the chains at which the flights are to be attached, elongated pins 180 are substituted for the conventional pins of the chain. These pins, which extend from one side of the chain in spaced parallel relation to one another, are slidingly received in sockets formed in the head end of T-shaped metal fittings 181. The body portions of the T-fittings are received in the ends of the flight bars 43, being embraced by the parallel side flanges of the flights and secured in place as by rivets 182.

During operation of the conveyor dimensional variations encountered in commercial production may cause the side chains 41 and 42 to move relatively toward and away from one another. Under such conditions the support pins 180 slide axially in the sockets of the flight end fittings 181 and prevent objectionable stresses in the parts of the machine. Turning or twisting of the individual flights relative to the side chains is resisted by the pairs of spaced support pins, the flights thus being held to predetermined paths in their cyclic movement.

The flights may be provided with vertical extension means which become effective during that portion of the flight path in which the flights are spaced a substantial distance above the conveyor apron 38 by reason of the action of the chain elevating tracks 169. The vertical extension of the flights is provided by means of one or more inserts nested or telescoped within the individual flights. As shown in Figs. 13 through 17, the inserts may comprise elongated bars 183 formed of metal or plastic material and receivable between the side flanges of the channel flights 43 for free sliding movement. These flight extension bars are retained in assembled relation in the hollow flight bars as by shouldered guide pins 184 the ends of which are secured in the web portions of the flight bars. The pins are received in spaced through apertures formed in the bars 183 adjacent the ends of the latter, the through apertures being formed with counterbores 185 to accommodate enlarged retaining heads 186 on the ends of the shouldered pins. As the flights move along their article advancing path over the transfer conveyor and the flight bars are individually elevated above the conveyor apron 38 the flight extension bars 183 drop by gravity from the hollow interiors of the flights, the limit of relative movement being determined by engagement of the pin heads 186 in the inner ends of the counterbores 185. During travel of the flights over the elevated portion of the article advancing path the extension bars 183 hang below the flight bars 43, suspended on the guide pins 184.

Lowering of the flight bars as the chains move over the downwardly curved or inclined portions 173 of the elevating tracks brings the lower edges of the extension bars 183 into sliding engagement with the upper surface of the conveyor apron 38, and the flight extensions are telescoped into the hollow flight bars as the flights move to the discharge lip 54 of the conveyor apron. During travel over the return run of the conveyor the flight bars 43 are inverted so that the extension bars 183 drop by gravity into their retracted positions.

At the receiving end of the conveyor the apron 38 is curved around the quill 19 providing a reversely bent portion 187 which engages the edges of the extension bars 183 to retain the latter retracted within the hollow flight bars as the flights are carried around the rotatable members or sprockets 45 and 46. End 188 of the reversely bent portion 187 of the conveyor apron may be disposed under the quill at an angle or in inclined relation to the flight path to provide a sliding cam surface engageable with projecting extension portions 183 to positively move the latter into the hollow channel flight bars prior to raising of the flights onto the upper or article advancing run of the conveyor. The transfer conveyor is not claimed per se herein but is disclosed and claimed in my co-pending application Serial No. 164,681, filed May 27, 1950.

*Receiving conveyor*

The wrapper infeed or receiving conveyor C comprises spaced, generally parallel frame members 28 and 29 connected together by suitable cross members and supported as by the wrapping machine frame. A pair of endless driven side belts or chains 32 are arranged in spaced parallel relation at the sides of the conveyor, being trained about rotatable elements at the conveyor ends and carrying between them a number of uniformly spaced flights 33. These flights individually engage articles deposited on supporting apron 34 of the conveyor and advance them one at a time over the conveyor and into the wrapping mechanism. Adjustable side guides 35 supported as by brackets 36 carried by the conveyor frames 28 and 29 engage articles on the conveyor apron 34 to center the articles on the latter.

*Article transfer platform*

On the outside of the extension brackets 52 and 53 of the transfer or slicer discharge conveyor, arms 56 and 57 are supported on the stub shafts 49 and 50, respectively, for relative turning movement so that the arms can be reciprocated up and down in unison. A cross member 58 is fastened as by cap screws to inturned ends 60 of the arms 56 and 57, the cross member being horizontally disposed in parallel relation to and spaced in advance of the discharge lip 54 of the conveyor apron.

Mounted on the cross member 58 is a tilt or article transfer platform comprising a fixed plate 61 and an extension plate 62. These plates are supported on angle brackets 63 spaced along the cross member 58, the brackets being secured to the cross member as by cap screws. The extension or movable plate 62 is interposed between the horizontal portions of the brackets 63 and the under side of the fixed plate 61 for sliding movement to vary the effective width of the platform. At its ends the fixed plate 61 is formed with integral downturned triangular flanges 64 which, in turn, have angularly disposed flanges secured against the cross member 58 by screws. An adjusting rod or shaft 65 is journaled in the triangular end flanges 64 of the fixed plate 61.

Adjacent the ends of the tiltable platform toothed wheels 66 are secured on the adjusting shaft, their teeth being receivable in matching spaced apertures or holes 67 formed in the extension plate 62. Turning of the adjusting shaft 65 as by means of a depending handle 68 formed on one end rotates the toothed wheels 66 to shift the extension plate 62 back and forth in the slideway provided, thereby regulating the effective article supporting size of the tiltable platform. The plate 62 can be replaced by one of another size merely by withdrawal from the slideway, the teeth of the wheels 66 otherwise holding the plate in adjusted position and guiding the plate for straight line movement during adjustment.

The receiving edge of the platform plate 61 is formed with a downturned lip 70 which is spaced from the lip 54 of the conveyor apron providing a clearance opening 71 through which the conveyor flights 33 can pass in disappearing travel about the end sprockets 47 and 48. A nut 72 threaded on the end of the adjusting shaft 65 remote from the handle 68 draws the hub of one of the toothed wheels 66 against the adjacent bracket 63 or flange 64 providing a frictional restraint against rotation of the adjusting shaft. If desired, a suitable friction washer may be carried on the shaft 65 and interposed between the parts, thus providing means for frictionally retaining the extension plate 62 in adjusted position. This feature is of considerable utility in that the operator can easily adjust the effective loaf supporting area of the tiltable platform while the apparatus is in operation.

The hub of the pivoted arm 57 has an integral extension 74 carrying at its outer end a roller 75 that engages the periphery of a cam 76 secured on a stub shaft 77 for rotation with the latter. This shaft is journaled in a boss 78 of the extension bracket 53 and is rotated by a sprocket 79 about which is trained endless chain belt 80. Drive sprocket 81 for the chain belt is secured on the stub shaft 50 which is driven by the conveyor sprocket 48. Thus the cam shaft 77 and the cam 76 rotate in timed relation to the movement of the flights of the discharge or transfer conveyor D. The sprockets are so proportioned that the cam turns through 360° or one complete revolution for each movement of the conveyor corresponding to the distance or space intervening between succeeding conveyor flights.

Figure 11:
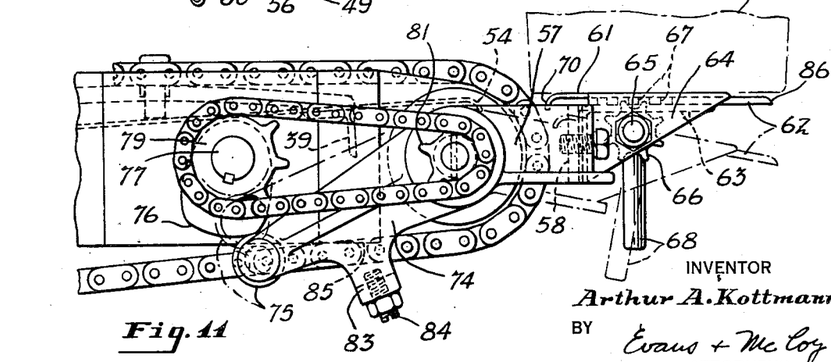
Fig. 11 is an elevational detail with parts broken away and removed showing the operating mechanism for the tiltable transfer platform, this view being taken substantially along the line indicated at 11—11 of Fig. 9 and enlarged with respect to that figure.

The weight of the tilt platform and an article A supported thereon (Figure 11) tends to turn the supporting arms 56 and 57 in a counterclockwise or platform lowering direction as viewed in Fig. 11, holding the roller 75 against the periphery of the cam 76. As the cam 76 is rotated, normally in a clockwise direction as viewed in that figure, the roller 75 rides about the cam periphery and the tiltable platform moves up and down between the raised or article receiving position shown in full lines and the lowered, downwardly inclined or article delivery position shown by the broken lines.

An angularly disposed extension 83 on the lever arm 74 carries an adjusting screw 84 which is engageable with a stop 85 on the extension bracket 53. Movement of the adjusting screw varies the position to which the tilt platform drops by gravity when the cam roller 75 rides off the high portion of the cam 76. In this manner the mechanism is adjusted so that, when the platform is in raised position, discharge end 86 of the extension plate 62 clears the tops of the flights 33 of the wrapper infeed conveyor C. Hence, if the discharge or transfer conveyor D be stopped while the wrapping machine conveyor C is continued in operation the movement of the flights 33 under the tilt platform does not result in striking or engaging of the platform by the flights. An article positioned on the tilt platform is not disturbed by the continued movement of the wrapper conveyor flights thereunder and the possibility of an article being dislodged from the transfer platform and misplaced on the wrapping machine conveyor is avoided.

A further advantage is obtained in the transfer of articles between the slicer discharge conveyor and the wrapper infeed conveyor by reason of the angularity in a vertical plane between the article supporting surface of the platform 61—62 and the article supporting surface of the wrapper conveyor apron 34. As shown in diagrammatic Figure 21, the downwardly inclined transfer platform makes an obtuse angle with the upwardly inclined conveyor apron when the transfer platform is in lowered or article transfer position. This angularity causes the article on the transfer platform to lean or tilt forward so that the top of the article bears against the top of the preceding article and advances the preceding article forwardly along the conveyor apron. This action provides a space between the lower portions of the articles which insures that the leading article clears the discharge end 86 of the tilt platform. Subsequent raising of the platform, as will be later described, occurs without tilting or displacing of the article just deposited on the conveyor and the latter is properly positioned on the conveyor apron for pick up by the next flight.

*Conveyor drive*

Power for operating the several conveyors of the apparatus is derived from any suitable source although, for most applications, it is preferable to couple one instrumentality, or the slicing machine and its conveyors, to the other instrumentality or wrapping machine and its conveyors, and to drive the slicing machine conveyors from or in timed relation to the wrapping machine so that one article or bread loaf is delivered from the slicing machine to the wrapping machine for each operating or wrapping cycle of the latter. It is understood, of course, that the power for driving the cutter blades 4 is separately provided as more fully explained in the patent and the copending application for patent referred to.

The conveyor system of the present slicing machine may be coupled with the conveyor systems of numerous conventional wrapping machines, a suitable wrapper being disclosed in United States Patent 2,088,157 and indicated diagrammatically at W in Fig. 12 of the present disclosure. An electric drive motor 160 turns main drive shaft 161 of the wrapper by means of an endless belt or chain 162 and suitable reduction gearing, the wrapping machine being so designed that the main shaft turns through one revolution of 360° for each wrapping operation or cycle and for each movement of the conveyor C corresponding to one flight space. The wrapping machine infeed conveyor C is driven from the shaft 161 by an endless belt or chain 163 which turns an intermediate shaft 164, the latter driving one end shaft 165 of the conveyor through suitable gearing. Sprockets which comprise the previously mentioned rotatable elements at the ends of the wrapper conveyor C and which are mounted on the conveyor shaft 165 carry and actuate the previously mentioned conveyor side chains or belts 32.

The slicing machine conveyors are driven from the wrapping machine by an endless chain belt 90 trained at one end about a sprocket secured on one end of the wrapper main drive shaft 161. The other end of the chain 90 is trained about a sprocket secured on a cross shaft 89 journaled at its ends in brackets carried by the side frames 1 and 2 of the slicing machine. The journal brackets for the shaft 89 also support a shaft 91 which is above and parallel to the shaft 89. These shafts are coupled by gears for simultaneous rotation in opposite directions. This arrangement provides a convenient means for imparting the desired direction of rotation to the rotatable components of the slicing machine conveyors regardless of the direction of rotation of the wrapping machine shaft or drive member from which the driving power for the slicing machine conveyors is obtained. On either the shaft 89 or the shaft 91, depending upon the desired rotational direction, is secured a sprocket which drives an endless chain belt 92. This chain belt turns a sprocket 93 of the drive member of a coupling device 94. This coupling device is of the overload release type such as indicated at 241 of Figs. 21 and 22 of copending application for patent Serial No. 740,542. In the present arrangement the overload release coupling is mounted on main drive shaft 95. This shaft is journaled in pedestals 96 supported on a horizontal cross member or plate 97 the ends of which are bolted to base portions of the machine side frames 1 and 2.

The overload coupling 94 transmits to the shaft 95 the normal drive torque required to operate the slicing machine conveyors. The coupling slips or ratchets upon an increase in torque above a predetermined limit so that, for example, the sprocket 93 and the parts associated therewith may turn or be turned while the shaft 95 and related parts remain fixed or stationary.

Since the slicing machine conveyors are arranged to operate in timed cyclic relation to the wrapping machine the drive parts are so proportioned that the main shaft 95 of the slicer turns through one revolution or 360° for each cycle of the wrapping machine, and for each revolution of the wrapper main shaft 161. Preferably, the overload coupling 94 is of the type that establishes a driving connection at only a single rotative point or angular relationship of its component parts. With such an overload coupling the re-establishment of the driving connection after a release due to an overload occurs only with the slicing machine conveyors in the desired timed relation to the wrapping machine cycle and wrapping machine conveyor C.

An idler sprocket 98 is provided to take up slack in the main drive chain 92, the idler being carried on a stub shaft supported by a bracket 99 attached to the cross base plate 97.

Clutch

Figure 5:
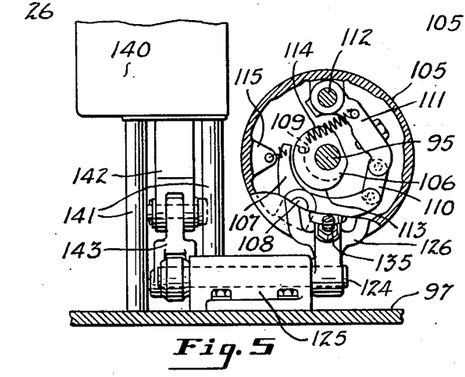
Fig. 5 is an elevational detail partly in section and with parts broken away and removed showing the interior of the clutch mechanism, this view being taken substantially along the line indicated at 5—5 of Fig. 7.

The infeed conveyor 6 and the discharge or transfer conveyor D of the slicing machine are driven from the main shaft 95 by endless chain belts 100 and 101 respectively. These chains are trained about sprockets 102 and 103 secured on and rotatable with a hollow cylindrical housing 105 which is supported on the shaft 95 for relative turning movement. The housing comprises the outer or driven member of a "one point" clutch assembly. Inner member or drive dog 106 of the clutch assembly (Fig. 5) is secured on the shaft 95 for rotation with the latter.

A pawl 107 centrally pivoted on a pin 108 carried in an internal bracket of the drum 105 is engageable at one end with a shoulder 109 of the inner clutch member or dog to establish a driving connection between the parts. The other end of the pawl 107 is connected by a link 110 to a lever 111 secured on a housing supported stub shaft 112. A curved peripheral face 113 on the dog 106 is eccentric to the rotational axis of the shaft 95 and by engagement with the pivoted lever 111 acts as a guide governing movement of the lever and the toggle linkage in shifting the pawl into engaged position. The cam face on the dog also prevents movement of the toggle linkage beyond dead center under spring influence in clutch engaging direction other than in a predetermined portion of the rotational cycle of the clutch parts. Articulation of the link connected lever 111 and the pawl 107 moves the shoulder engaging end of the latter into and out of the path of the shoulder 109 on the drive dog or member of the clutch. The lever 111 is normally biased to swing the pawl 107 to engaged position by helical coil spring 114 tensioned between the lever and an internal bracket 115 formed in the housing 105.

Figure 6:
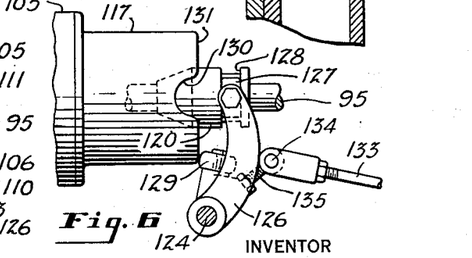
Fig. 6 is an elevational detail showing the locking housing portion of the clutch mechanism.

A cover plate 116 is sealingly received and secured against the open side of the housing 105 for rotation with the latter. This plate has a running fit on the main drive shaft 95. A gasket carried by the plate embraces the shaft to provide a liquid seal which permits the interior of the housing 105 to be filled with oil or other lubricant. An axially disposed integral tubular extension 117 of cylindrical form rotates with the cover plate 116 in concentric relation about the axis of the main drive shaft. The lever shaft 112 extends through and is supported in a boss on the cover plate 116. On the end of the lever shaft 112 projecting within the cylindrical extension 117 is secured a lever arm 118. The end of this arm is in the form of an angularly disposed shoe 119 which is engageable by the tapered face of a cone 120 slidable axially along the main drive shaft 95. The cone is biased to the left, as viewed in Figs. 6 and 7, for movement into the tubular extension 117, as by a compression spring 121 received on the shaft 95 between the cone and an adjustable collar 122.

Beneath the clutch assembly a control shaft 124 is journaled for turning movement about a horizontal axis in an elongated bracket 125 bolted to the base plate 97. A yoke 126 is secured on one end of the shaft 124 the bifurcated upper end of the yoke straddling the cone 120 and being fitted with slide elements 127 which engage in an annular channel or groove 128 of the cone. This sliding interconnection of the yoke and cone permits the cone to be moved axially into and out of the cylindrical extension 117 of the clutch assembly while the cone is rotating. Movement of the cone into the tubular extension causes the cone to engage the shoe 119 of the lever 118, thus turning the stub shaft 112 counter-clockwise as viewed in Fig. 5 to swing the pawl 107 counter-clockwise on the pin 108 against the force of the spring 114 and withdraw the pawl from driving engagement with the shoulder 109 of the inner clutch member 106 rotating with the main drive shaft 95. Thus movement of the cone into the tubular housing extension of the clutch assembly operates to dis-engage the clutch and to stop the sprockets 102 and 103 which drive the slicing machine conveyors.

Movement of the cone into the tubular clutch extension is effected by the compression spring 121, the movement being restricted to a single rotational position of the clutch housing 105 and related parts by a roller 129 carried by the yoke 126. This roller is receivable in a recess 130 in end edge 131 of the cylindrical clutch housing extension 117. In all rotative positions of the clutch housing 105 other than that illustrated in Fig. 7, the yoke 126, by reason of engagement of the roller 129 against the end edge 131 of the housing extension 117, holds the cone 120 in retracted position, indicated in Fig. 6 and by the broken lines of Fig. 7. The roller 129 is engageable with the edge 131 of the clutch housing extension to retain the cone retracted until rotation of the clutch parts brings the recess 130 into alignment with the roller 129 permitting the latter to move into the housing extension under the influence of the compressed spring 121.

*Manual control*

Figure 7:
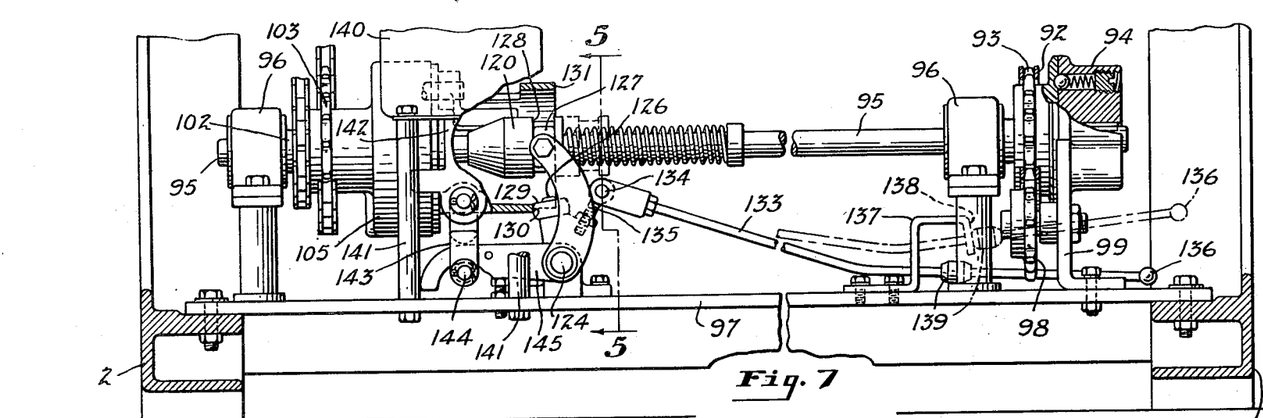
Fig. 7 is a foreshortened elevational detail of the main drive shaft and clutch, partly in section and with parts broken away and removed, this view being taken substantially along the line indicated at 7—7 of Fig. 3 and enlarged with respect to that figure.

Actuation of the yoke to swing to clutch engaged position, or to the right as viewed in Fig. 7, is effected either manually or electrically. The manual control comprises an adjustable length rod member 133 connected at one end by a pin 134 to an eye bolt 135 secured in the yoke 126. The rod 133 is disposed beneath the main drive shaft 95, extends through an opening in the journal bracket 96, and terminates at its other end in a handle 136 above the end of the base plate 97 adjacent the side frame 1.

An S-shaped bracket 137 is screwed to the base plate 97 adjacent the journal bracket 96 and is formed with a vertically elongated opening in which the rod 133 is guided. A depending portion 138 on the upper end of the S bracket is formed with an open ended slot for receiving the rod 133. A stop collar 139, secured on the rod 133, is engageable with the depending bracket portion 138 when the rod is shifted to the right, as viewed in Fig. 7 to hold the cone 120 in retracted position. The spring 121, acting against the cone 120, draws the stop collar 139 firmly against the depending portion 138 of the S bracket to prevent the rod 133 from dropping out of the open ended slot, thereby keeping the clutch parts in driving engagement. Thus the interfitting connection between the bracket retainer and the manual clutch actuating member is maintained by reason of the friction between the parts under the influence of the spring. Rapid release can be effected in an emergency by stepping on the handle 136 to force the rod out of the slot in the depending retainer 138.

*Electrical control*

Electrical actuation of the clutch is effected by an electromagnetic or solenoid coil indicated at 140. This coil is mounted on supports 141 secured to the base plate 97. Armature 142 of the solenoid is guided for vertical movement and is connected by a pair of links 143 to a roller 144 which is disposed beneath a hooked portion of a lever 145 secured on one end of the shaft 124 which carries the yoke 126. The curved end of the arm 145 is received between the links 143, the latter thus locating the roller 144 under the end of the lever. Energization of the solenoid draws the armature 142 upwardly, turning the shaft 124 clockwise (Fig. 7) to retract the cone 120 from the housing and permit the clutch spring 109 acting through the lever 111 and link 110 to swing the pawl 107 into the path of the shoulder 109 of the inner clutch member 106, thereby establishing a driving connection between the clutch parts. So long as energization of the solenoid 140 is retained the driving connection is maintained through the clutch.

Since the drive shoulder or jaw 109 of the clutch inner member 106 is engageable with the pawl 107 in only a single relative rotational position, the clutch constitutes a one point driving connection. Thus each pick-up or drive initiation of the slicing machine conveyors occurs only in timed relation to the wrapping cycle of the wrapping machine, it being understood that the shaft 95 and the inner clutch member 106 actuated thereby make a single revolution of 360° for each wrapping or operating cycle of the wrapping machine, and it being further understood that the drive for the slicing machine conveyors 6 and D effects movements of the flights of such conveyors equivalent to the distances between successive flights of the respective conveyors for each revolution or 360° turning of the main drive shaft 95. Furthermore, the interlocking or locating connection between the clutch housing extension cylinder 117 and the yoke roller 129 insures that the interruption of the slicing machine conveyor drive occurs only in a predetermined position of the clutch parts in which the slicing machine conveyors and their parts, particularly the flights 43 of the discharge conveyor, are located in predetermined positions. Additionally, the seating of the roller 129 in the recess 130 simultaneously with the interruption of the conveyor driving connection results in locking of the conveyor flights in predetermined positions.

The supply of electric current to the electromagnet or solenoid 140 may be conventionally provided using a suitable manual switch for connecting and disconnecting the solenoid for starting and stopping the conveyor drive at will. Desirably, however, the electrical circuit for energizing the clutch solenoid is similar to that in U. S. Patent 2,316,171 and includes suitable or similar safety devices. By such an arrangement de-energization of the solenoid 140 (which solenoid corresponds to the solenoid 204 of the electrical circuit referred to) resulting as from cutter band breakage causes the armature 143 to drop by gravity. The shaft mounted or embracing spring 121 then forces the cone 120 against the clutch disconnecting shoe 119 as soon as the clutch housing reaches that point in its rotation at which the recess 130 is in registry with the yoke roller 129, permitting the roller to move into the recess and lock the clutch extension 117 and the housing 105 against further rotation.

Optional alternative use of either the electrical control comprising the electro-magnet or solenoid 140 or the manual control comprising the rod 133 to actuate the clutch facilitates the use of the tandem slicer-wrapper combination of the present invention in bakeries which produce both sliced and unsliced bread loaf packages. In normal operation of the tandem combination for packaging sliced bread loaves, the clutch is governed by the electrical control. When it is desired to package or wrap unsliced bread loaves, the electrical circuit for the motor which drives the cutter blades 4 is de-energized. The clutch control and solenoid 140, being in the cutter drive motor circuit, is likewise de-energized, effecting disconnection of the conveyor driving clutch in the manner described. So that the slicing machine transfer conveyor D may be continued in operation and used as a loading conveyor for advancing unsliced articles into the wrapping machine, the conveyor clutch is connected by means of the manual control rod 133. Thus, with the cutter bands 4 idle, the transfer conveyor D may be continued or placed in operation and used as a wrapper feed conveyor in the packaging of unsliced articles.

The manually actuated clutch disconnecting rod 133 is adjusted so that in retracted position, indicated by the broken lines of Fig. 7, the yoke 126 and the cone 120, while being withdrawn sufficiently to permit the shoe 119 to swing inwardly for driving engagement to occur between the clutch pawl 107 and the clutch dog 109, are short of their ultimate limit of movement to the right. Energization of the solenoid 140 when the manual rod 133 is so retracted and held in raised position by interlocking engagement with the retainer as indicated by the broken lines of Fig. 7, causes the clutch yoke and cone to be shifted further to the right as viewed in the same figure, freeing the stop collar 139 from bearing engagement against the bracket portion 138 and permitting the rod 133 to drop by gravity from the open ended retainer slot in the bracket portion 138. Subsequent de-energization of the solenoid 140, as might occur in an emergency or in the event of the operation of the safety switches referred to, permits the declutching cone 120 to be moved into the tubular extension 117 by the spring 121 and against the shoe 119. Such de-energization of the solenoid thus results in conveyor stoppage since the prior release of the manual control prevents the latter from maintaining the conveyors in operation. The present arrangement therefore provides a safety feature in that the manual clutch control is automatically deactivated upon energization of the solenoid circuit for electrical control of the conveyor drive clutch.

Figure 8:
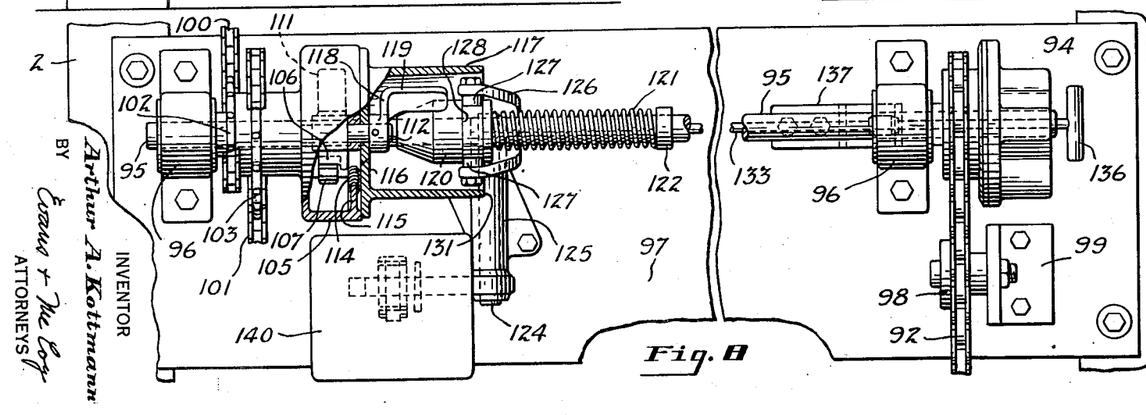
Fig. 8 is a fragmentary view partly in section and with parts broken away and removed showing the apparatus of Fig. 7.
Figures 9, 10:
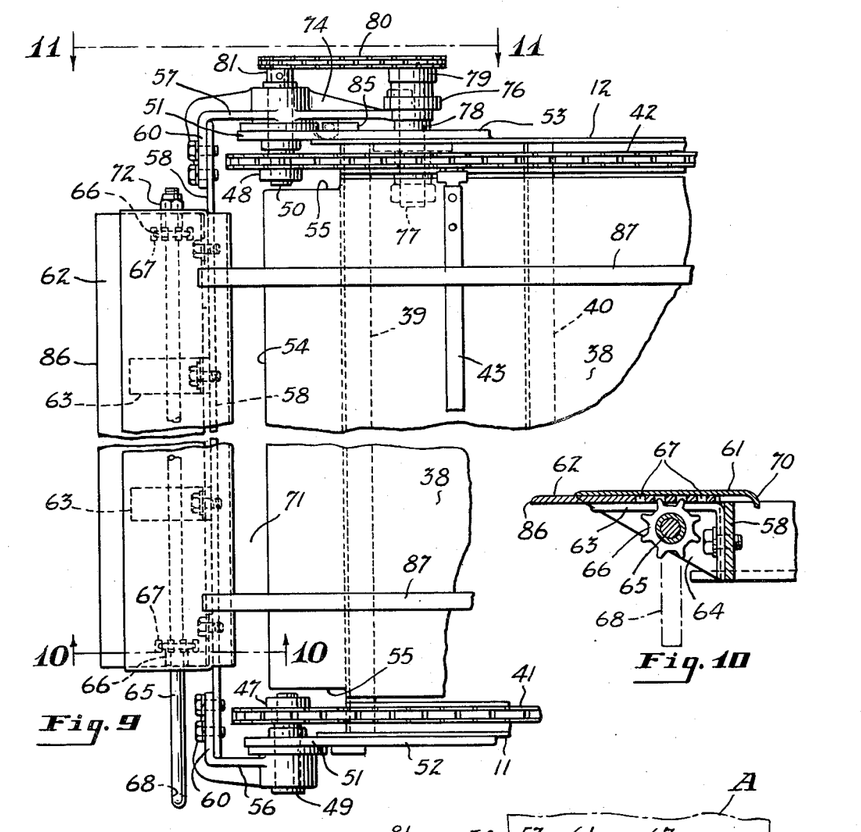
Fig. 9 is a foreshortened plan view with parts broken away and removed showing the discharge end of the slicing machine transfer conveyor and the tiltable platform shuttle mechanism associated therewith.
Fig. 10 is a fragmentary sectional detail showing the tiltable platform, this view being taken substantially along the line indicated at 10—10 of Fig. 9.

Although the rod 133 is referred to as a manual clutch control, it is apparent that, as previously mentioned, de-clutching may be effected by stepping on the handle 136 to force the rod through the open bottom end of the slot in the bracket portion 138. The stop collar 139 is thus freed from connection with the retainer so that the rod dropping by gravity clear of the retainer can be drawn or shifted to the left as viewed in Figs. 7 and 8 by the action of the spring 121 moving the clutch disconnecting cone 120 against the shoe 119.

The endless chain belt 100 drives the loading conveyor 5, the infeed conveyor 6 and such escapement or shuttle mechanism as may be desired between these conveyors. For example, the mechanisms may correspond to those disclosed in my copending application for patent referred to above. The endless chain belt 100 of the present case corresponds to the endless chain belt 226 of the earlier filed application.

*Flight space compensator*

The endless chain belt 101 for driving the transfer or discharge conveyor D corresponds to the endless chain belt 220 of the earlier application referred to. In the present case, however, means is provided on the shaft 20 for advancing or retracting the positions of the discharge conveyor flights 43 with respect to the flights of the infeed conveyor 6. It is apparent that this flight shifting or space compensating means is also effective to vary the relationship between the discharge conveyor flights 43 and the flights 34 of the wrapping machine infeed conveyor C. The present compensator design is associated with the quill-shaft combination 19—20 previously mentioned in connection with the description of the discharge conveyor D.

A sprocket 145 keyed or otherwise secured on one end of the shaft 20 is driven from the main shaft 95 by the endless chain belt 101, the shaft being journaled for rotation in the bushing 22 and within the quill 19. The end of the shaft 20 remote from the sprocket 145 and conveniently adjacent the operator's side of the machine mounts a coupling member 146 which is keyed to the shaft and turns therewith. A circular disc 147 is keyed on the quill 19 between the journal 23 and the coupling member 146. A series of equally spaced apertures 148 are formed in a circle adjacent the periphery of the disc 147. A spring pressed pin 149 carried by the coupling member 146 is selectively engageable in any one of the apertures 148 for establishing a driving connection between the quill and the shaft in different relative rotative positions. Manual manipulation of the pin 149 is facilitated by its knurled handle 150 so that the pin may be readily withdrawn in adjusting the compensator.

*Operation*

Figure 18:
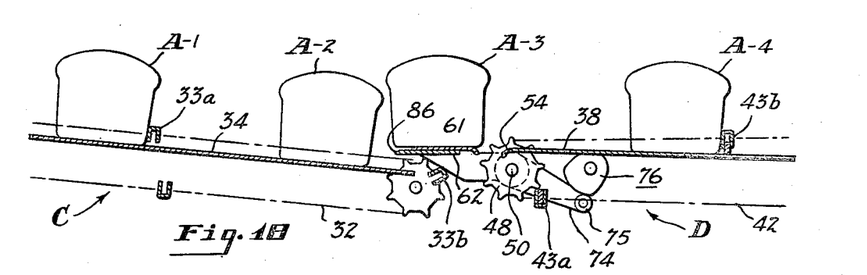
Figs. 18 through 21 are vertical sectional details, diagrammatic in character, taken longitudinally through the tiltable transfer platform and including portions of the slicing machine discharge conveyor and the wrapping machine infeed conveyor, these views showing successive stages in single cycles of operation transferring an article from the slicing machine conveyor to the wrapping machine conveyor.

Operation of the mechanisms, particularly the tiltable platform and the transfer or discharge conveyor, is illustrated in diagrammatic Figures 18 through 21. A succession of articles such as bread loaves are individually indicated at A-1, A-2, A-3, A-4 and A-5. Although described in stages, the movements of the mechanism parts and the articles are continuous except for the dwell periods of the transfer platform, and the articles on the latter and on the wrapper conveyor apron 34. In Fig. 18 article A-2 has just been deposited on the apron 34 of the wrapper infeed conveyor C and is about to be engaged and advanced by flight 33-b which is rounding the end rotatable elements of the wrapper conveyor. Preceding flight 33-a of the wrapper conveyor is completing the movement of a previously deposited article A-1 away from the receiving zone of the conveyor apron 34.

Flight 43-a of the discharge or transfer conveyor D has completed the movement of article A-3 onto the plate 61 of the tiltable platform and the flight is commencing the return movement over the bottom run of the conveyor side chains 41 and 42 to the receiving end of the conveyor. The next flight 43-b of discharge conveyor D is moving article A-4 to the end of the conveyor. In this position of the parts the cam 76, which rotates counter-clockwise (see arrows) as viewed in the diagrammatic figures, has just swung the tiltable platform plate 61 to its upper limit of movement about the axis of the shaft 50 and the platform will dwell or be retained in this raised position during the travel of the high portion of the cam over the roller 75 on the platform tilting arm 74. During this travel of the cam, as from the position shown in Fig. 18 to the position shown in Fig. 19, the wrapper conveyor flight 33-b moves onto the conveyor apron 34 behind the deposited article A-2 beyond and clear of the discharge end 86 of the tilt platform plate. Meanwhile the wrapper flight 33-a has completed the movement of the article A-1 away from the receiving zone of the wrapper conveyor C and the transfer conveyor flight 43-b has continued to move the article A-4 toward the discharge lip 54 at the end of the conveyor.

Figure 19:
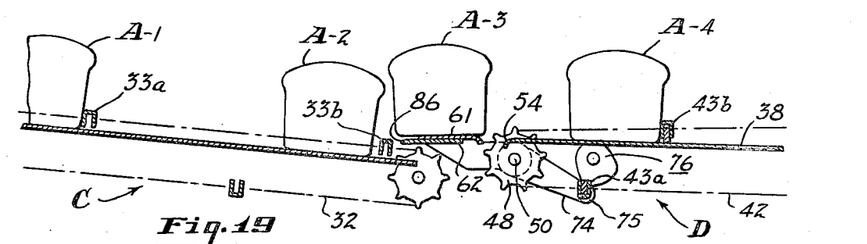
Figure 20:
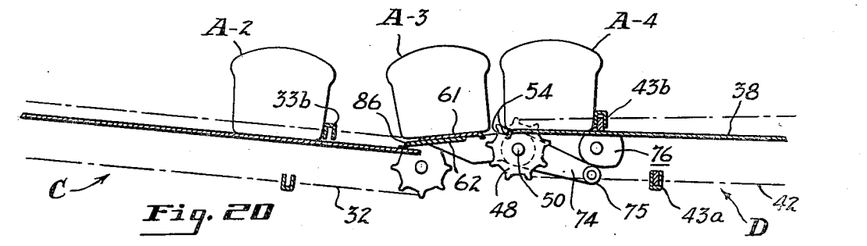

Continued movement of the parts, in which the cam 76 moves from the position of Fig. 19 to the position of Fig. 20 completes the movement of the article A-4 to the discharge end of the transfer conveyor apron 38, the leading side of the article A-4 then overhanging the discharge lip 54 of the conveyor apron. Meanwhile wrapper conveyor flight 33-b has engaged the rear side of article A-2 and commenced to move the article away from the receiving zone of the wrapper conveyor apron 34 to make room on the conveyor apron for the next article A-3 now on the tilt platform. The high point of the cam 76 has released the cam roller 75 so that the tilt platform is free to drop by gravity to its lowered position as determined by the setting of the adjusting screw 84 (Fig. 11).

Figure 21:
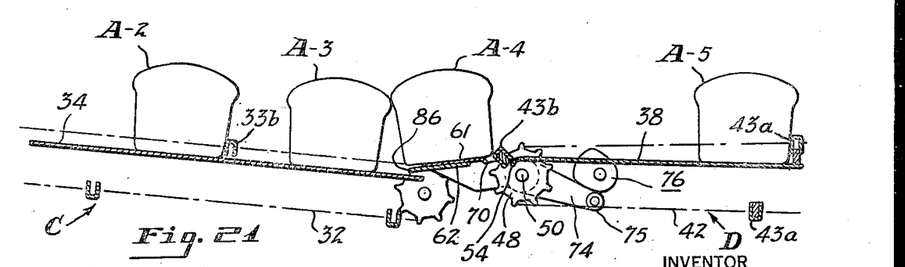

Continued movement of the parts, during which the cam 76 moves from the position of Fig. 20 to the position of Fig. 21 is the transfer step in which the article A-3 is pushed off the downwardly inclined tilt platform by the article A-4, the platform dwelling during the period of the transfer. This replacement of the article A-3 by the article A-4 occurs as the wrapper conveyor flight 33-b moves the article A-2 sufficiently far along the conveyor apron 34 to provide room thereon for the article A-3. Meanwhile a succeeding flight 43-c of the transfer or discharge conveyor D is moving the next succeeding article A-5 toward the end of the transfer conveyor to replace the article A-4 which is now on the tilt platform. Upon completion of the movement of the article A-4 onto the tilt platform by the flight 43-b the latter drops below the level of the conveyor apron 38 through the clearance space 71 between the conveyor apron lip 54 and the lip 70 of the tilt platform.

The cycle is completed by movement of the parts in which the cam 76 rotates from the position of Fig. 21 to the position of Fig. 18. The cam, acting against the roller 75 of the tilt platform arm, raises the platform to its upper limit of movement in which the article A-4 is elevated above the receiving zone of the wrapper conveyor apron 34. Thereafter the continued movement of the parts repeats the cycle for successive articles.

The transfer mechanism of the present invention, including the cam actuated tiltable platform, provides an arrangement in which an article is maintained on the platform in a dwell position ready to be deposited on the wrapper infeed conveyor in correct relation to the next advancing flight of the wrapper conveyor and in proper timed relation to the latter. In each instance the movement of an article from the tilt platform onto the wrapper conveyor apron occurs subsequent to the positive removal of the preceding article from the loading zone of the wrapper conveyor. Misloading of the wrapper conveyor such as the deposit of a plurality of articles in advance of a single flight and the deposit of an article on top of a flight is thus avoided.

Raising and lowering of the tiltable platform prevents metal to metal contact between such platform and the flights of the wrapper conveyor, producing quiet operation and minimum wear on the parts. By reason of the gravity operation of the tilt platform mis-adjustment of parts does not result in damage since any flights of the wrapper conveyor which engage beneath the tilt platform merely raise the latter harmlessly out of the way to permit flight passage.

In addition to the advantages referred to in connection with the transfer of articles from the slicing machine discharge conveyor to the wrapping machine infeed conveyor, the transfer platform combination also facilitates adjustment of the transfer or slicer discharge conveyor D to suit the particular dimensional characteristics of the bread loaves being sliced. In slicing machines of the present type, commonly referred to as inclined feed conveyor slicers, the articles move freely through the cutter bands 4 and are deposited thereby on the inclined receiving portion 14 of the discharge or transfer conveyor. It is essential, for proper movement of articles on the conveyor D and into the wrapping machine, that but a single loaf or article be received in each flight pocket of the conveyor D. As a flight of the infeed conveyor 6 pushes an article or loaf into the cutting zone, a sliced article is released from the cutters 4 and slides down the apron of the inclined conveyor portion 14. The released article rests against the rear side of one of the transfer conveyor flights 43 which thus serves to keep the article oriented and from sliding too rapidly down the conveyor apron. This mode of operation also minimizes any tendency of the individual slices to become misplaced. It is thus apparent that the positions of the discharge conveyor flights 43 with respect to the cutting zone of the blades 4 must vary in accordance with the size of the particular bread loaves or articles being processed in order that a flight will be in position to engage each article substantially immediately after release of such article by the cutters 4.

Figure 4:
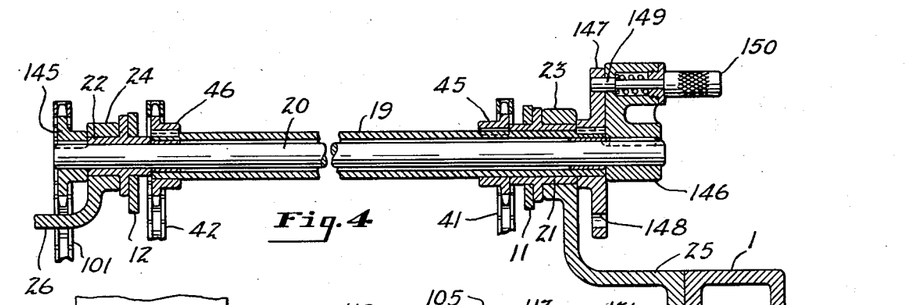
Fig. 4 is a sectional detail with parts broken away and removed taken longitudinally through the quill-shaft drive for the transfer conveyor substantially along the line indicated at 4—4 of Fig. 3 and enlarged with respect to that figure.

Adjustment of the discharge conveyor D to advance or retract the flights 43 relative to not only the wrapper conveyor flights 33 but also to the flights of the infeed conveyor 6 can be effected by the compensator device described in connection with Fig. 4. In effecting such adjustment the locking pin 149 is retracted from the perforated disc 147 by means of the knurled handle 150. The quill 19 and the shaft 20 are then turned relative to one another through a sufficient number of degrees to effect the desired advancement or retraction of the flights 43. The locking pin 149 is then seated to retain the quill and shaft in adjusted position. The adjustment described is made without disturbing the operation or functional characteristics of the tiltable transfer platform 61—62 for the reason that advancing or retracting the conveyor flights 43 merely alters the clearance space between successive articles, such clearance being represented by the space between the articles A-3 and A-4 in Fig. 13.

Figure 1:
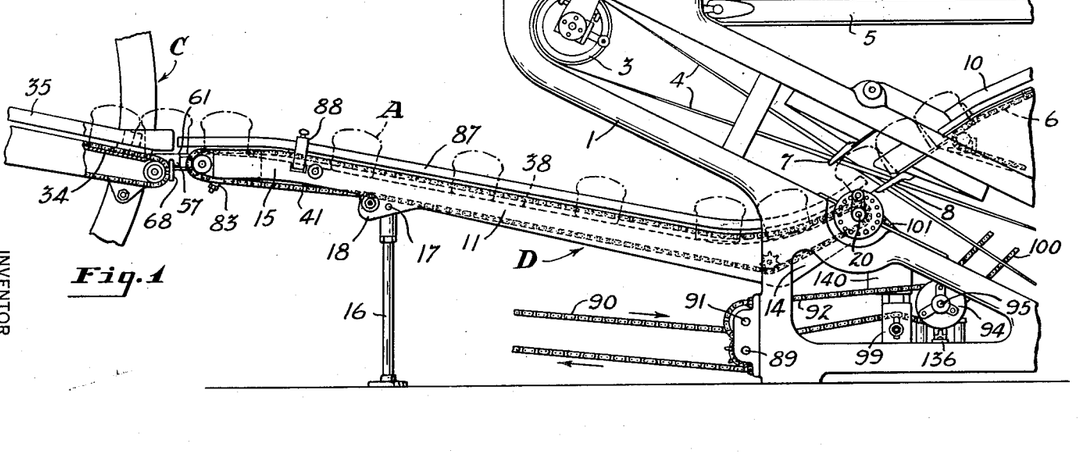
Figure 1 is a side elevational view of parts of a slicing machine wrapping machine combination showing the slicer discharge or transfer conveyor and a shuttle or transfer platform, the slicing machine being shown with parts broken away and removed and only a fragmentary end portion of the wrapping machine infeed conveyor being shown, the slicer and wrapper conveyors being coupled, providing for the continuous movement of a series of articles through the slicing machine and into and through the wrapping machine.
Figure 2:
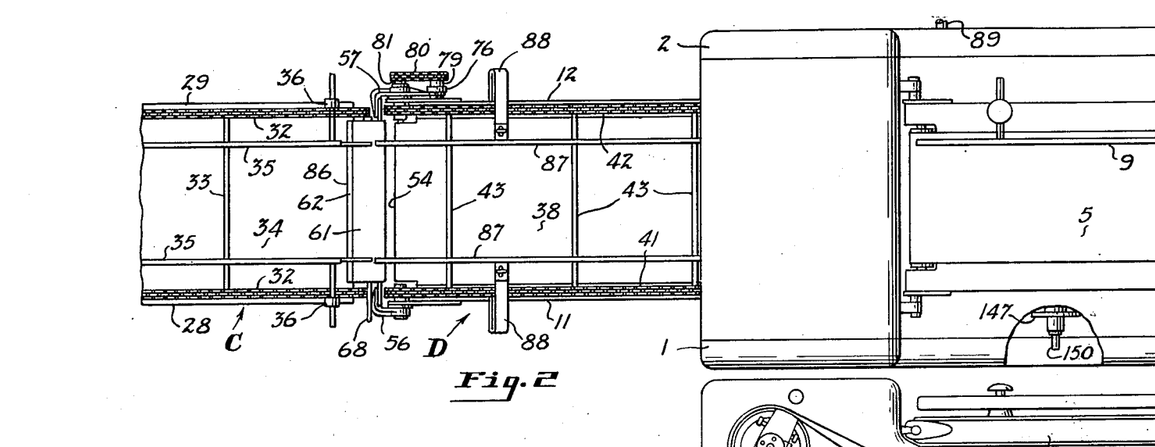
Fig. 2 is a plan view of the conveying or article handling apparatus of Fig. 1 including a fragmentary part of the slicing machine and a fragmentary part of the wrapping machine infeed conveyor.
Figure 3:
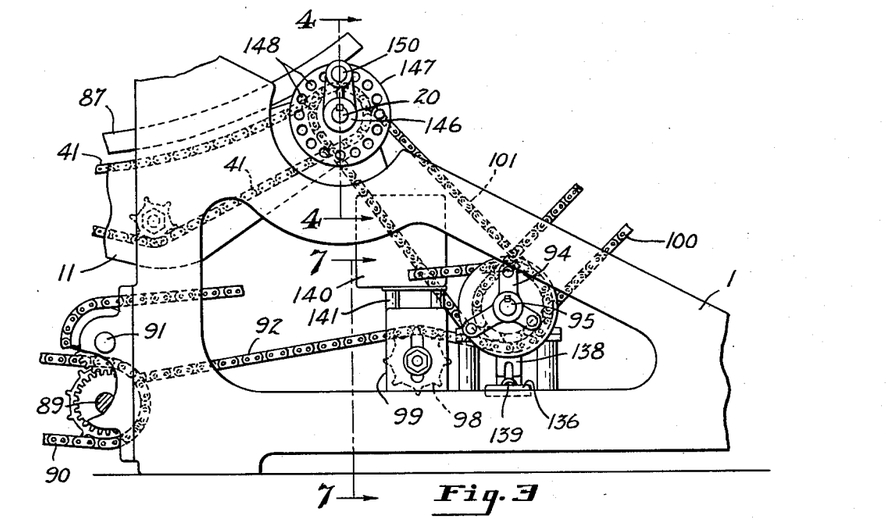
Fig. 3 is a fragmentary elevational detail, enlarged with respect to Figs. 1 and 2 and with parts broken away and removed, showing drive connections for the slicing machine conveyors.

In slicing machines of the inclined feed conveyor type, particularly machines having endless cutter bands arranged in crossed relation as illustrated herein and in the copending application and patent referred to, articles engaged in the cutters tend to be fed along and advanced by the action of the cutters. To prevent the placement of more than a single article or loaf between each pair of successive flights 43 of the transfer conveyor, the flights are timed to engage across the front of an article as it moves through the cutters to guide the movement of such article onto the conveyor apron and to hold back or retard excessively rapid forward movement of the succeeding articles. As indicated diagrammatically in Fig. 1, a plurality of articles may be disposed in contacting relation between the last flight of the slicer infeed conveyor 6 and the first flight of the slicer discharge or transfer conveyor D. Without the retarding or checking action of the transfer conveyor flights 43, the metering or placement of articles between the transfer conveyor flights would be uncontrolled and indefinite.

In stopping the conveyors while the cutter bands 4 are continued in operation, as for the purpose of adjusting the wrapping machine or for removing a misplaced or damaged article, it is desirable that the transfer conveyor D be stopped only in positions in which one of the flights 43 is located to prevent the movement of articles through the cutters and onto the conveyor apron 38. The one point clutch which restricts the stopping of the conveyors to a single predetermined position in the cycle of operation and the compensator governing the relative positions of the quill 19 and shaft 20, govern the stopping position of the flights 43 relative to the cross member 170 at the receiving end of the transfer conveyor. This stopping position of the conveyor flights must be adjusted in accordance with article size for the reason that the distance between the last flight of the slicer infeed conveyor 6 and the first flight of the discharge conveyor D is greater for large articles than for small articles. By means of the compensator on the quill-shaft end of the discharge or transfer conveyor D, the flights of the latter can be set so that, within the limit of adjustment, they stop with the first flight at any desired distance from the article supporting cross member 170. This arrangement permits the apparatus to be adjusted to prevent the movement of more than a single article into each pocket or flight space of the conveyor. A suitable stopping position for the discharge or transfer conveyor is illustrated in Fig. 13. Relative adjustment of the slicer feed conveyor flights and the slicer discharge conveyor flights can be effected as by the compensator shown at 232 in the copending application Serial No. 740,542 referred to above, or the latter compensator may be dispensed with.

The flights 43 are always adjusted so that when the parts are in the positions indicated in Fig. 14 with the flight 33–b of the wrapper infeed conveyor commencing its travel over the conveyor apron beyond the discharge edge 86 of the tiltable platform, the article A–4 being advanced to the tiltable platform is separated from the article A–3 supported by the platform by a clearance space. The clearance space thus provided between the article advancing to the tiltable platform and the article on the tiltable platform prevents the latter from being pushed off such platform until the flight 33–b of the wrapper infeed conveyor has moved clear.

An advantageous feature of the present invention is concerned with the stopping of the slicing machine conveyors as by dropping the manual control bar 133 or by de-energizing the electro-magnet 140. As previously explained, the dropping of the manual control bar or the de-energizing of the electro-magnet releases the yoke 126 so that the de-clutching cone 120 is free to be moved into the cylindrical clutch extension 117 by the compressed spring 121. The roller 129, however, by engagement with the end edge 131 of the clutch housing extension holds the cone 120 in retracted position, thereby preventing de-clutching action until that point in the rotation of the clutch housing at which the recess 130 is opposite or in registry with the roller 129 to permit the latter to move into the recess under the influence of the spring 121. Such movement is concurrent with the movement of the cone 120 against the shoe 119 to interrupt the drive.

The adjustment of the discharge or transfer conveyor drive through the endless chain belt 101 is so arranged that the flights 43 are substantially in the positions indicated in Fig. 13 when the described de-clutching action takes place, one of such flights having just completed the movement of an article onto the transfer platform 61—62. Accordingly, the drive arrangement of the present invention prevents stopping of the conveyor D with an article partially moved onto or off the tiltable platform. Additionally, the stoppage occurs only when the tiltable platform is held in raised dwell position with the roller 75 in engagement with the high region of the cam 76. Thus engagement of the tiltable plate 62 by the flights 33 of the wrapper infeed conveyor and bouncing of the tiltable platform on such flights is eliminated even though the wrapper infeed conveyor C is continued in operation after the slicing machine conveyors are stopped.

In accordance with the patent statutes the principles of the present invention may be utilized in various ways, numerous modifications and alterations being contemplated, substitution of parts and changes in construction being resorted to as desired, it being understood that the apparatus shown in the drawings and described above and the particular method of operation set forth are given merely for purposes of explanation and illustration without intending to limit the scope of the claims to the specific details disclosed.

What I claim and desire to secure by Letters Patent of the United States is:

1. In article handling apparatus, a flight conveyor, a conveyor to which the flight conveyor delivers, means for driving the conveyors, a clutch interposed between the flight conveyor and the drive means, said clutch comprising relatively rotatable members engageable only in a single relative rotational position, disconnectable means for establishing a driving connection between the rotatable members, means movable axially relative to the rotatable members for interrupting the driving connection, and means associated with said axially movable means co-acting with one of the rotatable members to prevent drive interrupting movement in all but a single rotative position of the one rotatable member.

2. In article handling apparatus, a conveyor having substantially equally spaced flights, a receiving conveyor, and drive means for actuating said conveyors, said drive means including a shaft turning through a predetermined number of degrees for each movement of the flight conveyor corresponding to the distance between successive flights and a clutch mounted on the shaft through which said flight conveyor is driven, the clutch having relatively rotatable parts, means for interconnecting said parts engageable to establish driving relation only in relative rotative positions multiples of said predetermined number of degrees, means movable on the shaft for disengaging the interconnecting means, and means associated with one of the clutch parts arranged to restrain disengaging movement of the movable means in all positions of the clutch parts other than a predetermined rotative position of the engaged clutch parts, whereby the flights of said flight conveyor are in predetermined positions when the conveyor is stopped.

3. In article handling apparatus, a conveyor having substantially equally spaced flights, a receiving conveyor, and drive means for actuating said conveyors, said drive means including a shaft turning through a predetermined number of degrees for each movement of the flight conveyor corresponding to the distance between successive flights and a clutch mounted on the shaft through which the flight conveyor is driven, the clutch having relatively rotatable parts, means for interconnecting said parts engageable to establish driving relation only in relative rotative positions multiples of said predetermined number of degrees, means biased on the shaft for movement to disengage the interconnecting means, and means associated with one of the clutch parts arranged to restrain disengaging movement of the movable means in all positions of the clutch parts other than a predetermined rotative position of the engaged clutch parts, whereby the flights of said conveyor are in predetermined positions when the conveyor is stopped.

4. In article handling apparatus, a conveyor having substantially equally spaced flights, a receiving conveyor, and drive means for actuating said conveyors, said drive means including a shaft turning through a predetermined number of degrees for each movement of the flight conveyor corresponding to the distance between successive flights and a clutch mounted on the shaft through which said flight conveyor is driven, the clutch having relatively rotatable parts, means for interconnecting said parts engageable to establish driving relation only in relative rotative positions multiples of said predetermined number of degrees, means movable on the shaft for disengaging the interconnecting means, and means associated with one of the clutch parts arranged to restrain disengaging movement of the movable means in all positions of the clutch parts other than a predetermined rotative position of the engaged clutch parts to stop said conveyor with its flights in predetermined positions, said restraining means including cooperating elements for locking the one clutch part against rotation in said positions.

5. In article handling apparatus, a conveyor system comprising in combination a plurality of conveyors arranged serially and including a transfer conveyor having spaced flights, a flight conveyor for feeding articles to the transfer conveyor and a flight conveyor for receiving articles from the transfer conveyor, and drive means interconnecting the conveyors for movement of their flights synchronously and in unison, the drive means including a clutch governing the operation of one of the conveyors, said clutch having relatively rotatable parts engageable only in predetermined relative successive rotative positions corresponding to the spacing of the flights of said one conveyor, control means operative to disengage the clutch parts, and means restricting operation of the control means substantially to a predetermined rotative position of the engaged clutch parts.

6. In article handling apparatus, a conveyor system comprising in combination a plurality of conveyors arranged serially and including a transfer conveyor having spaced flights, a flight conveyor for feeding articles to the transfer conveyor and a flight conveyor for receiving articles from the transfer conveyor, and drive means interconnecting the conveyors for movement of their flights synchronously and in unison, the drive means including a clutch governing the operation of the transfer conveyor, said clutch having relatively rotatable parts engageable only in predetermined relative successive rotative positions corresponding to movements of the transfer conveyor equivalent to its flight spacing, control means operative to disengage the clutch parts, and means restricting operation of the control means substantially to a predetermined rotative position of the engaged clutch parts to stop said transfer conveyor with its flights in predetermined positions.

7. In article handling apparatus, a conveyor system comprising in combination a plurality of conveyors arranged serially and including a transfer conveyor having spaced flights, a flight conveyor for feeding articles to the transfer conveyor and a flight conveyor for receiving articles from the transfer conveyor, and drive means interconnecting the conveyors for movement of their flights synchronously and in unison, the drive means including a clutch governing the operation of the transfer conveyor, said clutch having relatively rotatable parts engageable only in predetermined relative successive rotative positions corresponding to movements of the transfer conveyor equivalent to its flight spacing, control means operative to disengage the clutch parts, means restricting operation of the control means substantially to a predetermined rotative position of the engaged clutch parts and means associated with the drive means for advancing and retracting the flights of the transfer conveyor relative to the flights of the feeding and receiving conveyors.

8. In article handling apparatus, a conveyor system comprising in combination a plurality of conveyors arranged serially and including a transfer conveyor having spaced flights, a flight conveyor for feeding articles to the transfer conveyor and a flight conveyor for receiving articles from the transfer conveyor, and drive means interconnecting the conveyors for movement of their flights synchronously and in unison, the drive means including a clutch governing the operation of the transfer conveyor, said clutch having relatively rotatable parts engageable only in predetermined relative successive rotative positions corresponding to movements of the transfer conveyor equivalent to its flight spacing, a movable platform interposed between the transfer conveyor and the receiving conveyor for supporting articles moving from one conveyor to the other, means operating cyclically in timed relation to the movement of the flights of one of the conveyors for raising and lowering the platform between article receiving and article discharging positions, control means operative to disengage the clutch parts, means restricting operation of the control means substantially to a predetermined rotative position of the engaged clutch parts and to that portion of the platform cycle in which the platform is in article receiving position, and means associated with the drive means for relatively advancing and retracting the flights of the transfer conveyor with respect to the flights of the feeding and receiving conveyors.

9. In article handling apparatus, a conveyor system comprising in combination a plurality of conveyors arranged serially and including a tranfer conveyor having spaced flights, a flight conveyor for feeding articles to the transfer conveyor and a flight conveyor for receiving articles from the transfer conveyor, and drive means interconnecting the conveyors for movement of their flights synchronously and in unison, the drive means including a clutch governing the operation of the transfer conveyor, said clutch having relatively rotatable parts engageable only in predetermined relative successive rotative positions corresponding to movements of the transfer conveyor equivalent to its flight spacing, a movable platform interposed between the transfer conveyor and the receiving conveyor for supporting articles moving from one conveyor to the other, means operating cyclically in timed relation to the movement of the flights of one of the conveyors for raising and lowering the platform between article receiving and article discharging positions, control means operative to disengage the clutch parts, and means restricting operation of the control means substantially to a predetermined rotative position of the clutch parts and to that portion of the platform cycle in which the platform is in article receiving position.

10. In article handling apparatus, a conveyor system comprising in combination a plurality of conveyors arranged serially and including a transfer conveyor having spaced flights, a conveyor for feeding articles to the transfer conveyor and a flight conveyor for receiving articles from the transfer conveyor, and drive means interconnecting the conveyors for synchronous movement, the drive means including a clutch governing the operation of the transfer conveyor, said clutch having relatively rotatable parts engageable for establishing a driving connection only in predetermined relative positions rotatively spaced in correspondence to movements of the transfer conveyor equivalent to transfer conveyor flight spacings, control means operative to disengage the clutch parts, and means connected to one of the clutch parts for movement in unison therewith for restricting operation of the control means substantially to a predetermined rotative position of the engaged clutch parts to stop said transfer conveyor with its flights in predetermined positions with respect to said feed conveyor and said flight conveyor.

11. In article handling apparatus, a conveyor system comprising in combination a plurality of conveyors arranged serially and including a transfer conveyor having spaced flights, a conveyor for feeding articles to the transfer conveyor and a flight conveyor for receiving articles from the transfer conveyor, and drive means interconnecting the conveyors for synchronous movement, the drive means including a clutch governing the operation of the transfer conveyor, said clutch having relatively rotatable parts engageable for establishing a driving connection only in predetermined relative positions rotatively spaced in correspondence to movements of the transfer conveyor equivalent to transfer conveyor flight spacings, control means operative to disengage the clutch parts, and means connected to one of the clutch parts for movement in unison therewith for restricting operation of the control means substantially to a predetermined rotative position of the engaged clutch parts, said restricting means and said control means having interlocking elements for holding said one clutch part against rotation upon disengagement of the clutch parts.

12. Article handling apparatus comprising a plurality of conveyors arranged serially, one of said conveyors having uniformly spaced flights, means for driving said conveyors including a shaft, means connecting said shaft to said flight conveyor to move the same a distance corresponding to the space between flights thereof upon each revolution of the shaft including a clutch on said shaft having parts engageable in only a single relative rotational position of said parts, means normally holding said clutch parts in engagement, means for disengaging said clutch parts to stop said flight conveyor, and means for incapacitating said disengaging means in all but a single rotative position of the engaged clutch parts to cause the flight conveyor to be stopped with its flights in predetermined positions.

13. Article handling apparatus comprising a transfer conveyor having an apron and uniformly spaced flights traveling over its apron, a receiving conveyor having an apron and uniformly spaced flights traveling over its apron, a transfer platform supported beyond the discharge end of the transfer conveyor apron and overlying the apron of the delivery conveyor and movable from a receiving position clear of the flights of the receiving conveyor to a discharging position in the path of the delivery conveyor flights, means for oscillating said platform, a drive means interconnecting said conveyors and said platform oscillating means for operating the flights thereof synchronously and for moving said platform in timed relation to the movements of the flights, said drive means including a clutch governing the operation of the transfer conveyor and platform oscillating means and having relatively rotatable parts engageable only in predetermined relative successive rotative positions corresponding to movements of the transfer conveyor equivalent to its flight spacing, control means operative to disengage the clutch parts, and means restricting operation of the control means substantially to a predetermined rotative position of the engaged clutch parts in which the said platform is positioned clear of the flights of the receiving conveyor.

ARTHUR A. KOTTMANN.

REFERENCES CITED

The following references are of record in the file of this patent:

UNITED STATES PATENTS

| Number | Name | Date |
|---|---|---|
| 1,290,199 | Holland | Jan. 7, 1919 |
| 1,758,484 | Van Slyke | May 13, 1930 |
| 2,022,911 | Hayssen | Dec. 3, 1935 |
| 2,131,256 | Petskeyes | Sept. 27, 1938 |
| 2,241,721 | Hoppe | May 13, 1941 |
| 2,261,765 | Horwitz | Nov. 4, 1941 |
| 2,334,003 | Heintz | Nov. 9, 1943 |
| 2,400,502 | Hapman | May 21, 1946 |
| 2,417,782 | Petskeyes | Mar. 18, 1947 |
| 2,427,108 | Petskeyes | Sept. 9, 1947 |
| 2,443,010 | Petskeyes | June 8, 1948 |